(12) United States Patent
Kalyanaraman et al.

(10) Patent No.: US 9,469,734 B2
(45) Date of Patent: Oct. 18, 2016

(54) FAST DISSOLVING POLYIMIDE POWDERS

(75) Inventors: Viswanathan Kalyanaraman, Newburgh, IN (US); William E. Hollar, Mt Vernon, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 1104 days.

(21) Appl. No.: 13/072,559

(22) Filed: Mar. 25, 2011

(65) Prior Publication Data

US 2012/0245239 A1    Sep. 27, 2012

(51) Int. Cl.
| | |
|---|---|
| C08L 63/00 | (2006.01) |
| C08J 3/07 | (2006.01) |
| C08J 3/16 | (2006.01) |
| C08G 73/10 | (2006.01) |
| C08L 79/08 | (2006.01) |

(52) U.S. Cl.
CPC ............ *C08J 3/07* (2013.01); *C08G 73/106* (2013.01); *C08G 73/1046* (2013.01); *C08J 3/16* (2013.01); *C08L 63/00* (2013.01); *C08L 79/085* (2013.01); *C08J 2379/08* (2013.01); *Y10T 428/2982* (2015.01)

(58) Field of Classification Search
CPC .... C08G 73/1046; C08G 73/106; C08J 3/07; C08J 3/16; C08J 2379/08; C08L 63/00; C08L 79/085; Y10T 428/2982

USPC ................... 521/65, 157, 182, 183
See application file for complete search history.

(56) References Cited

U.S. PATENT DOCUMENTS

| | | | |
|---|---|---|---|
| 4,464,489 A * | 8/1984 | Noda et al. .................. 521/117 |
| 5,196,507 A | 3/1993 | Totani et al. | |
| 5,422,034 A * | 6/1995 | Hirai et al. .............. 252/299.01 |
| 6,362,304 B1 | 3/2002 | Hollar, Jr. et al. | |
| 7,592,072 B2 | 9/2009 | Buyny | |
| 2006/0039984 A1* | 2/2006 | Nakanishi et al. ........... 424/489 |

FOREIGN PATENT DOCUMENTS

| | | | |
|---|---|---|---|
| JP | 60221425 A | * | 11/1985 |
| JP | 07300524 A | * | 11/1995 |
| JP | 2006182853 A | * | 7/2006 |
| JP | 2006233023 A | * | 9/2006 |

OTHER PUBLICATIONS

Die Angewandte Makromolekulare Chemie 213 (1993) 93-111 (Nr. 3715); Toughening of highly crosslinked thermosetting resins by blending with thermoplastic . . . .

* cited by examiner

*Primary Examiner* — Irina S Zemel
(74) *Attorney, Agent, or Firm* — Cantor Colburn LLP

(57) ABSTRACT

Polyetherimide particles or powders with a high surface area and high porosity can be prepared by precipitation of polymer solution in hot water or steam without the use of any additives. The particles or powders produced rapidly dissolved in organic solvents as well as epoxy matrices.

11 Claims, 9 Drawing Sheets

FAST DISSOLVING POLYIMIDE POWDERS

BACKGROUND OF THE DISCLOSURE

1. Field of the Disclosure

The disclosure relates generally to polyimide particles and powders as well as to methods for the production thereof. More specifically, the disclosure relates to polyimide particles and powders, which dissolve rapidly in solvents and in polymers, such as epoxy, and methods for the production of such particles and powders.

2. Description of the Related Art

The addition of high heat thermoplastics like polyetherimide to epoxy materials enhances the toughness of the matrix while preserving other mechanical properties. Micronized polyimide powders, such as polyetherimide powders are used as additives for many products, because they can impart useful product attributes. A polyimide powder, for instance, can serve as thermoplastic impact modifier, can improve the toughness of bismaleimide (BMI) and/or epoxy, can impart high temperature resistance properties, can provide low moisture uptake, can provide improved Fire, Smoke and Toxicity (FST) properties, and provide excellent metal adhesion properties.

To improve the rate of dissolution of thermoplastics in composite materials, the industry follows one of two methods. First, a thermoplastic polymer can be dissolved in an organic solvent, such as methylene chloride. The resulting solution can be mixed into an epoxy material. The solvent is removed after epoxy and thermoplastic material are thoroughly mixed. See: Die Angewandte Makromolekulare Chemie 213 (1993) 93-111 (Nr. 3715), which is incorporated by reference in its entirety. Second, the thermoplastic polymer can be mechanically ground to a very fine particle size, for example, less than 100 microns or preferably less than 45 microns. Subsequently, the resultant micronized powder is dissolved in epoxy material. See: U.S. Pat. No. 7,592,072, which is incorporated by reference in its entirety.

Polyimide powders made by cryo-grinding, jet milling processes, emulsion processes, and mechanical grinding processes take too long to dissolve in solvents and polymers, such as epoxies. Additionally such fine polyimide powders can have a high conversion cost, involve dusting, dust inhalation, and/or explosion hazard as well as other materials handling difficulties. Therefore, such fine powders are often not desirable.

For the foregoing reasons, there is a need for particles that do not cause high conversion costs, nor require specialized material handling and dust inhalation precautions while simultaneously providing faster dissolution of thermoplastics in epoxy medium. Meeting this need would result in shorter cycle time and cost savings.

BRIEF SUMMARY OF THE INVENTION

Precipitation processes/methods, which do not have to involve any surfactants or additives, can be employed in order to improve the dissolution of particulate polyimides in a polymer matrix, such as an epoxy matrix.

A first embodiment of the invention relates to a method for producing porous polyimide particles. The method can include mixing a solution with water at a high shear rate to form an emulsion, wherein the solution comprises a polyimide and an organic solvent; removing the organic solvent from the emulsion; and recovering porous polyimide particles. For example, a polyetherimide polymer can be dissolved in an organic solvent, like methylene chloride (between 25% and 1% concentration range), and subsequently emulsified with water (the water:organic ratio can be varied between 3:1 to 1:1 ratio) using high shear mixing. The solvent can be removed by heating the solution and the resulting powder can be isolated and dried. Polyetherimide powders with a fluffy and porous structure produced according to such a method are illustrated in FIG. 6.

A second embodiment of the invention relates to another method for producing porous polyimide particles. The method can include injecting a solution into a flowing steam atmosphere, wherein the solution comprises polyimide and an organic solvent; removing the organic solvent; and recovering porous polyimide particles. For example, polyetherimide polymer can be dissolved in an organic solvent, like methylene chloride (between 25% and 1% concentration range). The polymer solution can be mixed with steam in several smaller parallel tubes forming a jet, and upon removal of solvent from the solution, the precipitated polymer powder can be isolated and dried. Polyetherimide powders with fluffy and porous structure produced according to such a method are illustrated in FIG. 7.

The polyetherimide powders obtained from the process according to both the first embodiment and the second embodiment processes can exhibit a high surface area and can dissolve in organic solvents and polymer matrices, such as epoxy matrices, rapidly.

A third embodiment of the invention relates to a particle or powder comprising polyimide, wherein the diameter of the particle or powder is in the range of 75 to 5,000 microns; and wherein the pore volume of the particle or powder is from greater than 0.01 up to and including 0.10 cc/g.

A fourth embodiment of the invention relates to a composition comprising one or more porous powders of polyetherimide, wherein the composition dissolves in epoxy in less than 5 hours, preferably from a few minutes to less than 2 hours.

A fifth embodiment of the invention relates to a porous powder comprising one or more particles of polyimide, wherein the diameter of the one or more particles is in the range of 75 to 5,000 microns; and wherein the pore volume of the one or more particles is from greater than 0.01 to 0.0 cc/g, wherein the pore size of the one or more particles is from more than 237 to 1500 Angstroms, and wherein the BET Surface area of the one or more particles is from more than 2.3 to 10 m$^2$/g.

A sixth embodiment of the invention relates to a polymer system comprising a polymer, such as an epoxy, and a dissolved polyimide, such as a polyetherimide, wherein the polyimide dissolves in the polymer in less than 5 hours.

A seventh embodiment of the invention relates to an article of manufacture comprising a particle or powder according to the third embodiment, a composition according to the fourth embodiment, a particle according to the fifth embodiment, or a polymer system according to the sixth embodiment.

The particle according to the third embodiment, the composition according to the fourth embodiment, and the porous powder according to the fifth embodiment can be made according to the process of the first embodiment or according to the process of the second embodiment.

Another embodiment includes an epoxy matrix comprising our dissolved porous powders.

Another embodiment includes an bismaleimide matrix comprising our dissolved porous powders.

In one embodiment, the porous powder compositions can contain additives such as stabilizers, mold release, colorants, antistatic, plasticizers, flow aids, antibacterials, antifungals, cross-linkers, hardeners, and the like.

These and other features, aspects, and advantages of the present invention will become better understood with reference to the following description and appended claims.

BRIEF DESCRIPTION OF THE DRAWINGS

These and other features, aspects, and advantages of the present invention will become better understood with reference to the following description and appended claims, and accompanying drawings where:

Figure 1:
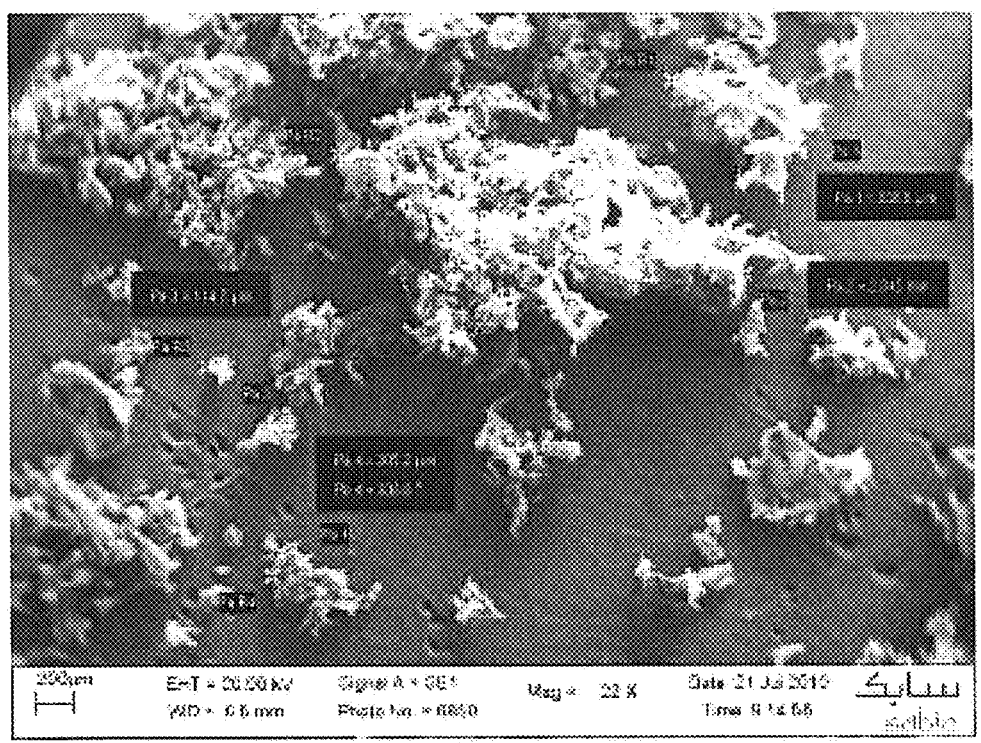
FIG. 1 is an image of particles produced according to Example 1.

It should be understood that the various embodiments are not limited by the drawings.

DETAILED DESCRIPTION OF THE INVENTION

Our invention is based on the remarkable discovery that it is possible to make a porous polymeric powders containing porous particle that dissolve quickly in solvents. The powders have a combination of specific diameter and pore volume parameters when the powders are made by certain methods under certain conditions. The ability of the powders to dissolve quickly can substantially reduce the cycle time of products made from the powders. The porous powders function as a highly effective polyimide delivery system for polyimides.

The present invention may be understood more readily by reference to the following detailed description of preferred embodiments of the invention as well as to the examples included therein. In the following detailed description and in the claims, which follow, reference will be made to a number of terms, which shall be defined to have the following meanings:

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure. All percentages and ratios are "by weight" unless expressly denoted otherwise.

A first embodiment relates to a method for producing porous polyimide particles or porous polyimide powders, which includes mixing a solution with water at a high shear rate to form an emulsion. The solution can include a polyimide and an organic solvent.

The polyimide can be selected from polyetherimides, siloxane-polyetherimides, polyetherimide sulfones, and combinations thereof.

The polyetherimides are of formula (1):

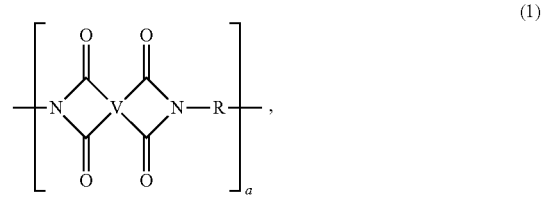

wherein a is more than 1, for example 10 to 1,000 or more, or more specifically 10 to 500.

The group V in formula (1) is a tetravalent linker containing an ether group (a "polyetherimide" as used herein) or a combination of an ether groups and arylene sulfone groups (a "polyetherimide sulfone"). Such linkers include but are not limited to: (a) substituted or unsubstituted, saturated, unsaturated or aromatic monocyclic and polycyclic groups having 5 to 50 carbon atoms, optionally substituted with ether groups, arylene sulfone groups, or a combination of ether groups and arylene sulfone groups; and (b) substituted or unsubstituted, linear or branched, saturated or unsaturated alkyl groups having 1 to 30 carbon atoms and optionally substituted with ether groups or a combination of ether groups, arylene sulfone groups, and arylene sulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to carbon atoms; (c) cycloalkylene groups having 3 to 20 carbon atoms, or (d) divalent groups of formula (2):

wherein $Q^1$ includes but is not limited to a divalent moiety such as —O—, —S—, —C(O)—, —SO$_2$—, —SO—, —C$_y$H$_{2y}$— (y being an integer from 1 to 5), and halogenated derivatives thereof, including perfluoroalkylene groups.

In an embodiment, linkers V include but are not limited to tetravalent aromatic groups of formula (3):

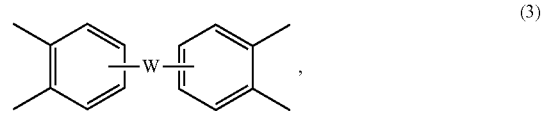

wherein W is a divalent moiety including —O—, —SO$_2$—, or a group of the formula —O—Z—O— wherein the divalent bonds of the —O— or the —O—Z—O— group are in the 3,3', 3,4', 4,3', or the 4,4' positions, and wherein Z includes, but is not limited, to divalent groups of formulas (4):

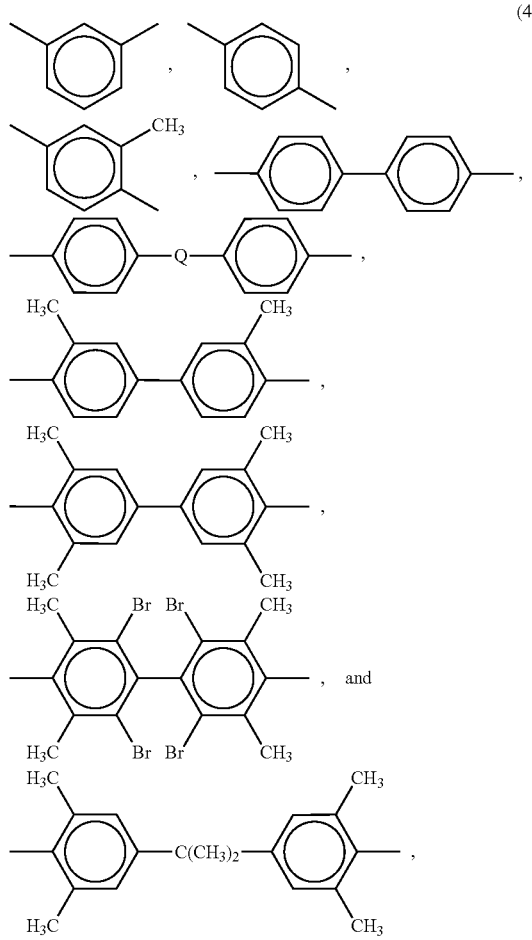

wherein Q includes, but is not limited to a divalent moiety including —O—, —S—, —C(O)—, —SO$_2$—, —SO—, —C$_y$H$_{2y}$— (y being an integer from 1 to 5), and halogenated derivatives thereof, including perfluoroalkylene groups.

In a specific embodiment, the polyetherimide comprise more than 1, specifically 10 to 1,000, or more specifically, 10 to 500 structural units, of formula (5):

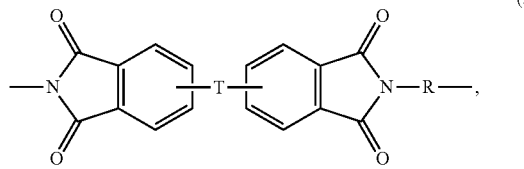

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (3) as defined above; and R is a divalent group of formula (2) as defined above.

In another specific embodiment, the polyetherimide sulfones are polyimides comprising ether groups and sulfone groups wherein at least 50 mole % of the linkers V and the groups R in formula (1) comprise a divalent arylene sulfone group. For example, all linkers V, but no groups R, can contain an arylene sulfone group; or all groups R but no linkers V can contain an arylene sulfone group; or an arylene sulfone can be present in some fraction of the linkers V and R groups, provided that the total mole fraction of V and R groups containing an aryl sulfone group is greater than or equal to 50 mole %.

Even more specifically, polyetherimide sulfones can comprise more than 1, specifically to 1,000, or more specifically, 0.10 to 500 structural units of formula (6):

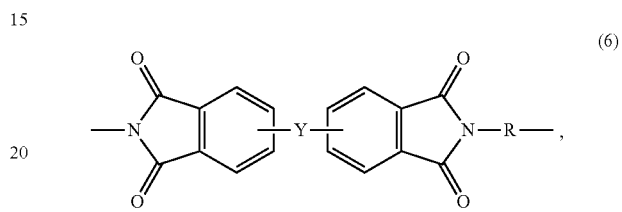

wherein Y is —O—, —SO$_2$—, or a group of the formula —O—Z—O— wherein the divalent bonds of the —O—, SO$_2$—, or the —O—Z—O— group are in the 3,3', 3,4', 4,3', or the 4,4' positions, wherein Z is a divalent group of formula (3) as defined above and R is a divalent group of formula (2) as defined above, provided that greater than 50 mole % of the sum of moles Y+moles R in formula (2) contain —SO$_2$— groups.

It is to be understood that the polyetherimides and polyetherimide sulfones can optionally comprise linkers V that do not contain ether or ether and sulfone groups, for example linkers of formula (7):

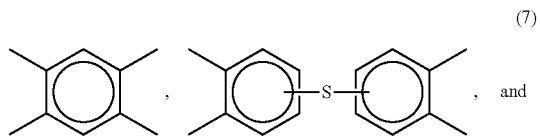

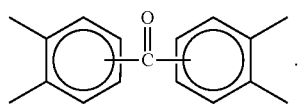

Imide units containing such linkers are generally be present in amounts ranging from 0 to 10 mole % of the total number of units, specifically 0 to 5 mole %. In one embodiment no additional linkers V are present in the polyetherimides and polyetherimide sulfones.

In another specific embodiment, the polyetherimide comprises 10 to 500 structural units of formula (5) and the polyetherimide sulfone contains 10 to 500 structural units of formula (6).

The polyetherimide and polyetherimide sulfones can be prepared by various methods, including, but not limited to, the reaction of a bis(phthalimide) for formula (8):

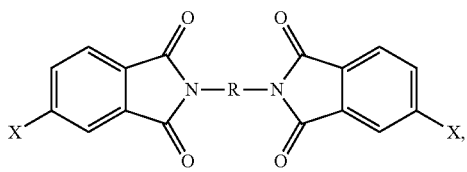

(8)

wherein R is as described above and X is a nitro group or a halogen. Bispthalimides (8) can be formed, for example, by the condensation of the corresponding anhydride of formula (9):

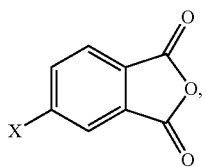

(9)

wherein X is a nitro group or halogen, with an organic diamine of the formula (10):

$$H_2N—R—NH_2 \qquad (10),$$

wherein R is as described above.

Illustrative examples of amine compounds of formula (10) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl) sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl) propane, 2,4-bis(b-amino-t-butyl) toluene, bis (p-b-amino-t-butylphenyl)ether, bis(p-b-methyl-o-aminophenyl) benzene, bis(p-b-methyl-o-aminopentyl)benzene, 1,3-diamino-4-isopropylbenzene, bis(4-aminophenyl)ether and 1,3'-bis(3-aminopropyl) tetramethyldisiloxane. Mixtures of these amines can be used. Illustrative examples of amine compounds of formula (10) containing sulfone groups include but are not limited to, diamino diphenyl sulfone (DDS) and bis(aminophenoxy phenyl) sulfones (BAPS). Combinations comprising any of the foregoing amines can be used.

The polyetherimides can be synthesized by the reaction of the bis(phthalimide) (8) with an alkali metal salt of a dihydroxy substituted aromatic hydrocarbon of the formula HO—V—OH wherein V is as described above, in the presence or absence of phase transfer catalyst. Suitable phase transfer catalysts are disclosed in U.S. Pat. No. 5,229,482. Specifically, the dihydroxy substituted aromatic hydrocarbon a bisphenol such as bisphenol A, or a combination of an alkali metal salt of a bisphenol and an alkali metal salt of another dihydroxy substituted aromatic hydrocarbon can be used.

In one embodiment, the polyetherimide comprises structural units of formula (5) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is 2,2-diphenylenepropane group (a bisphenol A group). Further, the polyetherimide sulfone comprises structural units of formula (6) wherein at least 50 mole % of the R groups are of formula (4) wherein Q is —SO$_2$— and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a 2,2-diphenylenepropane group.

The polyetherimide and polyetherimide sulfone can be used alone or in combination. In one embodiment, only the polyetherimide is used. In another embodiment, the weight ratio of polyetherimide:polyetherimide sulfone can be from 99:1 to 50:50.

The polyimides can have a weight average molecular weight (Mw) of 5,000 to 100,000 grams per mole (g/mole) as measured by gel permeation chromatography (GPC). In some embodiments the Mw can be 10,000 to 80,000. The molecular weights as used herein refer to the absolute weight averaged molecular weight (Mw).

The polyimides can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The polyimides can have a glass transition temperature of greater than 180° C., specifically of 200° C. to 500° C., as measured using differential scanning calorimetry (DSC) per ASTM test D3418. In some embodiments the polyimide, an in particular a polyetherimide has a glass transition temperature of 240 to 350° C.

The polyimides can have a melt index of 0.1 to 10 grams per minute (g/min), as measured by American Society for Testing Materials (ASTM) DI 238 at 340 to 370° C., using a 6.7 kilogram (kg) weight.

One process for the preparation of polyetherimides having structure (1) is referred to as the nitro-displacement process (X is nitro in formula (8)). In one example of the nitro-displacement process, N-methylphthalimide is nitrated with 99% nitric acid to yield a mixture of N-methyl-4-nitrophthalimide (4-NPI) and N-methyl-3-nitrophthalimide (3-NPI). After purification, the mixture, containing approximately 95 parts of 4-NPI and 5 parts of 3-NPI, is reacted in toluene with the disodium salt of bisphenol-A (BPA) in the presence of a phase transfer catalyst. This reaction yields BPA-bisimide and NaNO$_2$ in what is known as the nitro-displacement step. After purification, the BPA-bisimide is reacted with phthalic anhydride in an imide exchange reaction to afford BPA-dianhydride (BPADA), which in turn is reacted with meta-phenylene diamine (MPD) in ortho-dichlorobenzene in an imidization-polymerization step to afford the product polyetherimide.

An alternative chemical route to polyetherimides having structure (1) is a process referred to as the chloro-displacement process (X is Cl in formula (8)). The chloro-displacement process is illustrated as follows: 4-chlorophthalic anhydride and meta-phenylene diamine are reacted in the presence of a catalytic amount of sodium phenyl phosphinate catalyst to produce the bischlorophthalimide of metaphenylene diamine (CAS No. 148935-94-8). The bischolorophthalimide is then subjected to polymerization by chloro-displacement reaction with the disodium salt of BPA in the presence of a catalyst in ortho-dichlorobenzene or anisole solvent. Alternatively, mixtures of 3-chloro- and 4-chlorophthalic anhydride may be employed to provide a mixture of isomeric bischlorophthalimides which may be polymerized by chloro-displacement with BPA disodium salt as described above.

Siloxane polyetherimides can include polysiloxane/polyimide block copolymers having a siloxane content of greater than 0 and less than 40 weight percent (wt %) based on the total weight of the block copolymer. The block copolymer comprises a siloxane block of Formula (1):

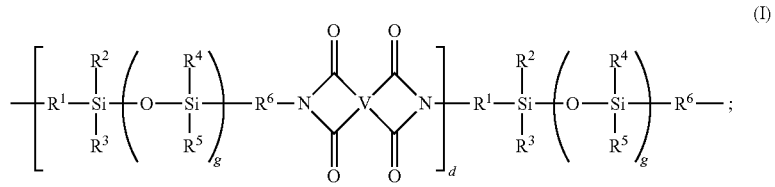

wherein $R^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20. Commercially available siloxane polyetherimides can be obtained from SABIC Innovative Plastics under the brand name SILTEM* (*Trademark of SABIC Innovative Plastics IP B.V.)

The organic solvent can be selected from an alkylene halide, chlorinated aromatic solvents, cyclohexanones, substituted pyrollidones, methylene chloride, chloroform, chlorobenzene, dichlorobenzene, cresol, NMP (N-Methyl Pyrrolidinone), DMF (Dimethyl Formamide), DMSO (Dimethyl Sulfoxide), DMAC (Dimethyl Acetamide), Anisole (Methyl Phenyl Ether), Veritol (o-Dimethoxy Benzene), Pyridine, Nitro Benzene, Methyl Benzoate, Benzonitrile, Acetophenone, and combinations thereof.

The concentration of the polyimide in the solution can be in a range having an upper limit and/or a lower limit. The range can include or exclude the upper and/or lower limit. The upper and/or lower limit can be selected from 0.5, 0.75, 0.80, 0.85, 0.90, 0.95, 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30%. For example, the concentration of the polyimide in the solution can be from 1% to 25%.

The ratio of water to organic components in the emulsion according to the first embodiment can be from 3:1 to 1:1, from 2.5:1 to 1:1, or from 2:1 to 1:1.

The method for producing porous polyimide particles according to the first embodiment can also include removing the organic solvent from the emulsion. The organic solvent is preferably removed by heating the emulsion. The emulsion can be heated to a temperature in a range having an upper limit and/or a lower limit. The range can include or exclude the upper and/or lower limit. The upper and/or lower limit can be selected from 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, and 120° C. For example, the emulsion can be heated to a temperature of from 70 to 90° C. or to a temperature of greater than 80° C. The temperature can include temperatures within the foregoing upper and/or lower limits.

The method for producing porous polyimide particles or porous polyimide powders according to the first embodiment can also include recovering porous polyimide particles, and/or drying the recovered porous polyimide particles.

The particles or powders produced according to the method of the first embodiment can have an average diameter in a range having an upper limit and/or a lower limit. The range can include or exclude the upper and/or lower limit. The upper and/or lower limit can be selected from 60, 61, 62, 63, 64, 65, 66, 67, 68, 69, 70, 71, 72, 73, 74, 75, 76, 77, 78, 79, 80, 85, 90, 95, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 41100, 4200, 4300, 4400, 4500, 4600, 4700, 4800, 4900, 5000, 5100, 5200, 5300, 5400, 5500, 5600, 5700, 5800, 5900, and 6000 microns. For example, the particles or powders produced according to the method of the first embodiment can have a diameter in the range of 75 to: 5,000 microns. The average diameters can include average diameters within the foregoing upper and/or lower limits.

Advantageously, particles or powders that are more than 75 microns in diameter are less prone to dust inhalation, explosion, and thereby more "Environmental Health and Safety" (EHS) friendly.

The particles or powders produced according to the method of the first embodiment can have a total pore volume in a range having an upper limit and/or a lower limit. The range can include or exclude the upper and/or lower limit. The upper and/or lower limit can be selected from 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, and 0.5 cc/g. For example, the particles or powders produced according to the method of the first embodiment can have a pore volume that is greater than 0.01 to 0.10 cc/g. The total pore volume can include total pore volumes within the foregoing upper and/or lower limits.

The pore size of the particle or powder produced according to the method of the first embodiment can be in a range having an upper limit and/or a lower limit. The range can include or exclude the upper and/or lower limit. The upper and/or lower limit can be selected from 100, 125, 150, 175, 200, 225, 226, 227, 228, 229, 230, 231, 232, 233, 234, 235, 236, 237, 238, 239, 240, 241, 242, 243, 244, 245, 246, 247, 248, 249, 274, 299, 300, 324, 349, 374, 399, 424, 449, 474, 499, 500, 600, 700, 800, 900, 1000, 1100, 1200, 1300, 1400, 1425, 1430, 1435, 1440, 1445, 1450, 1455, 1460, 1465, 1470, 1475, 1480, 1485, 1490, 1495, 1500, 1505, 1510, 1515, 1520, 1525, 1530, 1535, 1540, 1545, 1550, 1555, 1560, 1565, 1570, 1575, 1580, 1585, 1590, 1595, and 1600 Angstroms. For example, the pore size of the particle or powder produced according to the method of the first embodiment can be in a range from more than 237 to 1500 Angstroms, from 300 to 500 Angstroms, or up to 1000 Angstroms. The pore size can include pore sizes within the foregoing upper and/or lower limits.

The BET Surface area of the particle or powder produced according to the method of the first embodiment can be in a range having an upper limit and/or a lower limit. The range can include or exclude the upper and/or lower limit. The upper and/or lower limit can be selected from 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, 5.5, 6.0, 6.5, 7.0, 7.5, 8.0, 8.5, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, and 11.0 $m^2/g$. For example, the BET Surface area of the particle or powder produced according to the method of the first embodiment can be from more than 2.3 to 10 $m^2/g$. The BET Surface area can include BET Surface areas within the foregoing upper and/or lower limits.

A second embodiment relates to a method for producing porous polyimide particles or porous polyimide powders, which includes injecting a solution into a flowing steam atmosphere, wherein the solution comprises polyimide and an organic solvent. The solution can be injected into the flowing steam atmosphere through a plurality of parallel tubes to form a jet.

The polyimide can be selected from polyetherimides, siloxane-polyetherimides, polyetherimide sulfones and combinations thereof.

The organic solvent can be selected from an alkylene halide, chlorinated aromatic solvents, cyclohexanones, substituted pyrollidones, methylene chloride, chloroform, chlorobenzene, dichlorobenzene, cresol, NMP (N-Methyl Pyrrolidinone), DMF (Dimethyl Formamide), DMSO (Dimethyl Sulfoxide), DMAC (Dimethyl Acetamide), Anisole (Methyl Phenyl Ether), Veritol (o-Dimethoxy Benzene), Pyridine, Nitro Benzene, Methyl Benzoate, Benzonitrile, Acetophenone, and combinations thereof.

The concentration of the polyimide in the solution can be in a range having an upper limit and/or a lower limit. The range can include or exclude the upper, and/or lower limit. The upper and/or lower limit can be selected from 0.5, 0.75, 0.80, 0.85, 0.90, 0.95, 1, 2, 3, 4, 5, 6, 7, 8, 9, 10, 11, 12, 13, 14, 15, 16, 17, 18, 19, 20, 21, 22, 23, 24, 25,26, 27, 28, 29, and 30%. For example, the concentration of the polyimide in the solution according to the second embodiment can be from 1% to 25%. The concentration can include concentrations within the foregoing upper and/or lower limits.

The ratio of water to organic components in the emulsion according to the second embodiment can be from 3:1 to 1:1, from 2.5:1 to 1:1, or from 2:1 to 1:1.

The method for producing porous polyimide particles or porous polyimide powders according to the second embodiment can also include recovering porous polyimide particles, and/or drying the recovered porous polyimide particles.

The particles or powders produced according to the method of the second embodiment can have an average diameter in a range having an upper limit and/or a lower limit. The range can include or exclude the upper and/or lower limit. The upper and/or lower limit can be selected from 60, 61, 62, 63, 64, 65, 66, 67, 68, 69, 70, 71, 72, 73, 74, 75, 76, 77, 78, 79, 80, 85, 90, 95, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3.900, 4000, 4100, 4200, 4300, 4400, 4500, 4600, 4700, 4800, 4900, 5000, 5100, 5200, 5300, 5400, 5500, 5600, 5700, 5800, 5900, and 6000 microns. For example, the particles or powders produced according to the method of the second embodiment can have a diameter in the range of 75 to 5,000 microns. The average diameter can include average diameters within the foregoing upper and/or lower limits.

The particles or powders produced according to the method of the second embodiment can have a pore volume in a range having an upper limit and/or a lower limit. The range can include or exclude the upper and/or lower limit. The upper and/or lower limit can be selected from 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, and 0.5 cc/g. For example, the particles or powders produced according to the method of the second embodiment can have a pore volume that is greater than 0.01 to 0.10 cc/g. The pore volume can include pore volumes within the foregoing upper and/or lower limits.

The pore size of the particle or powder produced according to the method of the second embodiment can be in a range having an upper-limit and/or a lower limit. The range can include or exclude the upper and/or lower limit. The upper and/or lower limit can be selected from 100, 125, 150, 175, 200, 225, 226, 227, 228, 229, 230, 231, 232, 233, 234, 235, 236, 237, 238, 239, 240, 241, 242, 243, 244, 245, 246, 247, 248, 249, 274, 299, 300, 324, 349, 374, 399, 424, 449, 474, 499, 500, 600, 700, 800, 900, 1000, 1100, 1200, 1300, 1400, 1425, 1430, 1435, 1440, 1445, 1450, 1455, 1460, 1465, 1470, 1475, 1480, 1485, 1490, 1495, 1500, 1505, 1510, 1515, 1520, 1525, 1530, 1535, 1540, 1545, 1550, 1555, 1560, 1565, 1570, 1575, 1580, 1585, 1590, 1595, and 1600 Angstroms. For example, the pore size of the particle or powder produced according to the method of the second embodiment can be in a range from more than 237 to 1500 Angstroms, from 300 to 500 Angstroms, or up to 1000 Angstroms. The pore size can include pore sizes within the foregoing upper and/or lower limits.

The BET Surface area of the particle or powder produced according to the method of the second embodiment can be in a range having an upper limit and/or a lower limit. The range can include or exclude the upper and/or lower limit.

The upper and/or lower limit can be selected from 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, 5.5, 6.0, 6.5, 7.0, 7.5, 8.0, 8.5, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, and 11.0 $m^2/g$. For example, the BET Surface area of the particle or powder produced according to the method of the second embodiment can be from more than 2.3 to 10 $m^2/g$. The BET Surface area can include BET Surface areas within the foregoing upper and/or lower limits.

Figure 8:
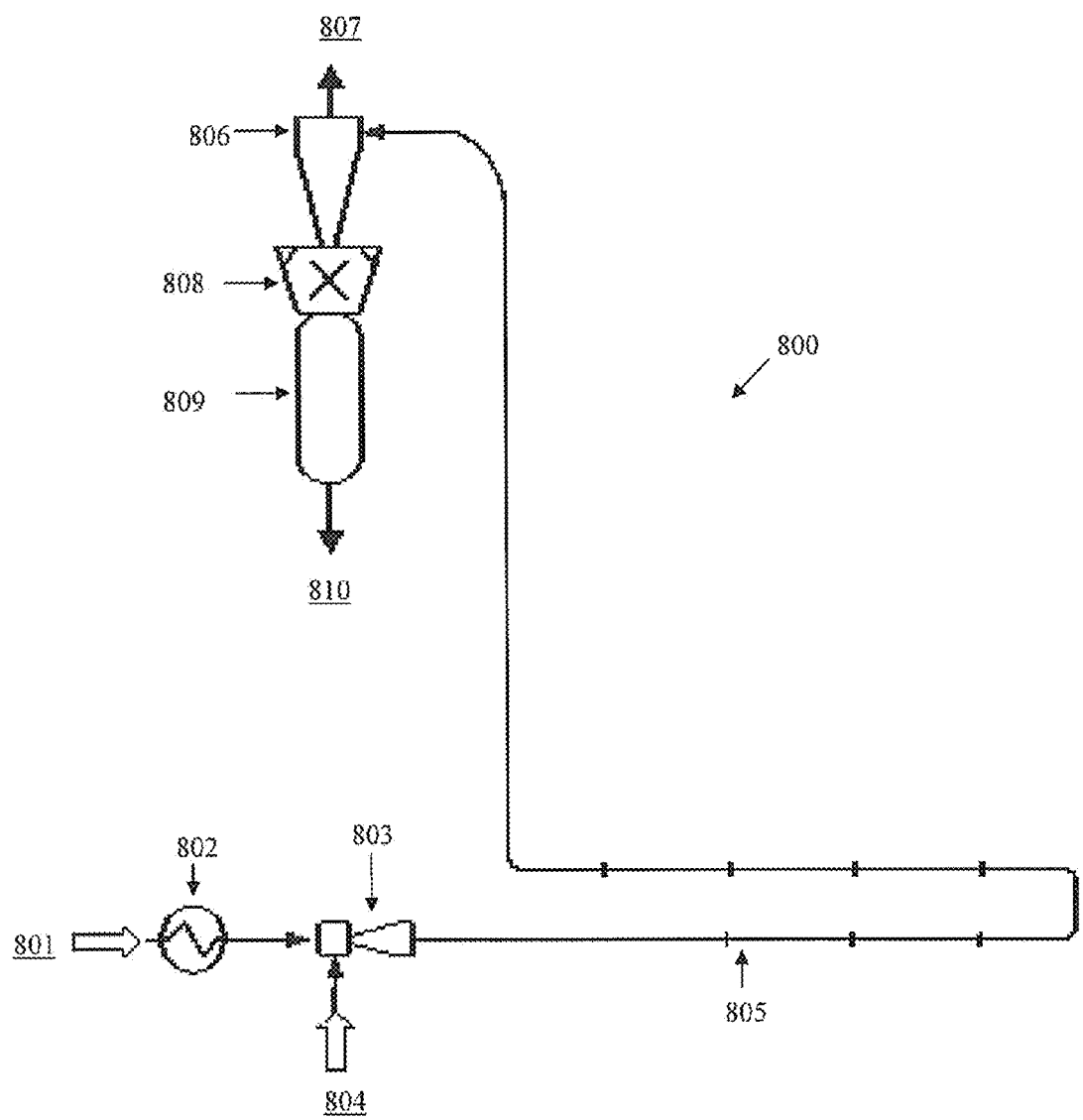
FIG. 8 is a schematic diagram of an apparatus for producing porous polyimide particles or porous polyimide powders according to one embodiment.

Referring to FIG. 8, an apparatus 800 for producing porous polyimide particles or porous polyimide powders according to the second embodiment is illustrated. A solution 801, comprising a polyimide and an organic solvent can be provided to optional preheater 802. Preheater 802 can preheat the solution to a suitable temperature, e.g., from 25 to 45° C. The preheated solution 801 can then be injected into a precipitation jet 803, which is supplied with steam 804. A mixture of steam 804 and solution 801 can exit the precipitation jet 803 and pass through a jacketed loop 805. Jacketed loop 805 can be from 250 to 750 feet in length. Jacketed loop 805 can empty into a cyclone 806, which can employ centrifugal force to separate steam and organic solvent 807. Heavy substances in cyclone 806 can pass into Fitz mill 808 and then into column dryer 809. Porous polyimide resin particles or powders 810 can thus be obtained directly.

Figure 9:
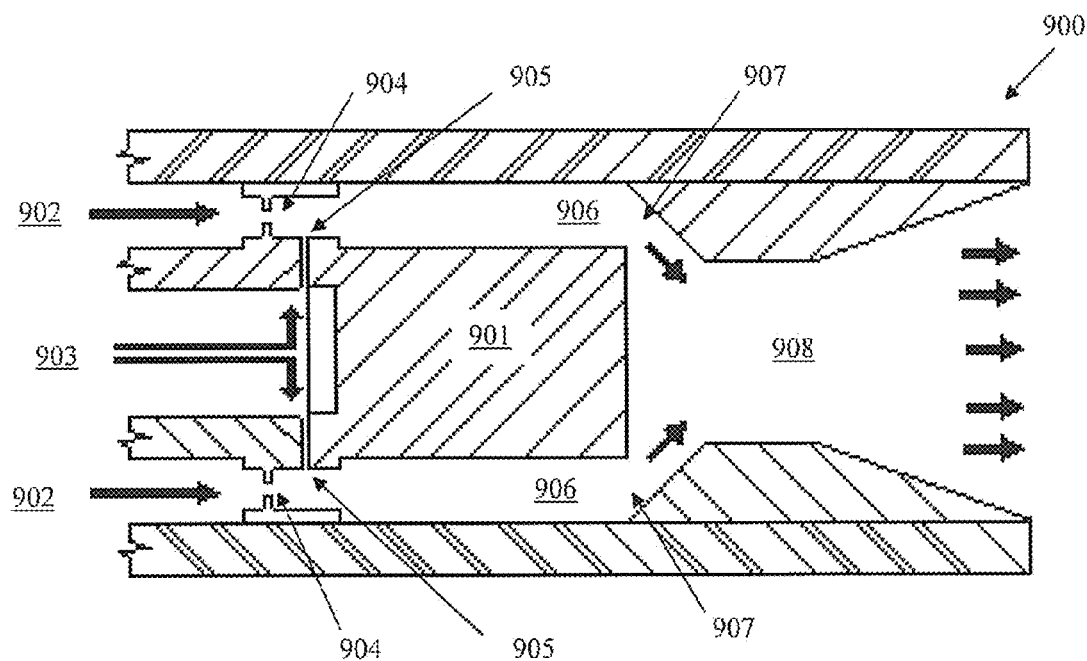
FIG. 9 is a schematic cross-sectional view of a precipitation jet employed in one embodiment.

Referring to FIG. 9, an enlarged cross-sectional view of a precipitation jet 900 is shown. Precipitation jet 900 can be the same as or different from precipitation jet 803 in FIG. 8. The precipitation jet 900 can include a rigid body 901. Steam 902 and a solution 903 can be injected into the precipitation jet 900 through a plurality of channels defined by the rigid body 901. The plurality of channels can include restrictions 904 through which the steam 902 must pass, as well as restrictions 905 through which the solution 903 must pass. After passing through the restrictions 905, and 904, a mixture of atomized droplets of steam and solution are produced in channels 906 of the precipitation jet 900. After taking tortuous paths 907, the mixture of atomized droplets empty into exit channel 908. Precipitation jet 900 can provide excellent mixing of steam and the solution.

A third embodiment relates to a particle or powder comprising a polyimide. The particle or powder can be porous. The polyimide can be selected from polyetherimides, siloxane-polyetherimides, polyetherimide sulfones, and combinations thereof.

The particles or powders according to the third embodiment can have a diameter in a range having an upper limit and/or a lower limit. The range can include or exclude the upper and/or lower limit. The upper and/or lower limit can be selected from 60, 61, 62, 63, 64, 65, 66, 67, 68, 69, 70, 71, 72, 73, 74, 75, 76, 77, 78, 79, 80, 85, 90, 95, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, and 6000 microns. For example, the particles or powders according the third embodiment can have a diameter in the range of 75 to 5,000 microns. The diameters can include diameters within the foregoing upper and/or lower limits.

The particles or powders according to the third embodiment can have a pore volume in a range having an upper limit and/or a lower limit. The range can include or exclude the upper and/or lower limit. The upper and/or lower limit can be selected from 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, and 0.5 cc/g. For example, particles or powders according the third embodiment can have a pore volume that is greater than 0.01 to 0.10 cc/g. The pore volume can include pore volumes within the foregoing upper and/or lower limits.

The pore size of the particle or powder according to the third embodiment can be in a range having an upper limit and/or a lower limit. The range can include or exclude the upper and/or lower limit. The upper and/or lower limit can be selected from 100, 125, 150, 175, 200, 225, 226, 227, 228, 229, 230, 231, 232, 233, 234, 235, 236, 237, 238, 239, 240, 241, 242, 243, 244, 245, 246, 247, 248, 249, 274, 299, 300, 324, 349, 374, 199, 424, 449, 474, 499, 500, 600, 700, 800, 900, 1000, 1100, 1200, 1300, 1400, 1425, 1430, 1435, 1440, 1445, 1450, 1455, 1460, 1465, 1470, 1475, 1480, 1485, 1490, 1495, 1500, 1505, 1510, 1515, 1520, 1525, 1530, 1535, 1540, 1545, 1550, 1555, 1560, 1565, 1570, 1575, 1580, 1585, 1590, 1595, and 1600 Angstroms. For example, the pore size of the particle or powder according to the third embodiment can be in a range from more than 237 to 1500 Angstroms, from 300 to 500 Angstroms, or up to 1000 Angstroms. The pore size can include pore sizes within the foregoing upper and/or lower limits.

The BET Surface area of the particle or powder according to the third embodiment can be in a range having an upper limit and/or a lower limit. The range can include or exclude the upper and/or lower limit. The upper and/or lower limit can be selected from 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, 5.5, 6.0, 6.5, 7.0, 7.5, 8.0, 8.5, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, and 11.0 $m^2/g$. For example, the BET Surface area of the particle or powder according to the third embodiment can be from more than 2.3 to 10 $min^2/g$. The BET Surface areas can include BET Surface areas within the foregoing upper and/or lower limits.

A concentration of a particle or powder according to the third embodiment can dissolve in epoxy at a dissolution temperature and in a dissolution time. The concentration can be in a range having an upper limit and/or a lower limit. The range can include or exclude the upper and/or lower limit. The upper and/or lower limit can be selected from 1, 2, 3, 4, 5, 10, 15, 20, 21, 22, 23, 24, 25, 26, 27, 28, 29, 30, 35, 40, 45, 45.5, 46, 46.5, 47, 47.5, 48, 48.5, 49, 49.5, and 50%. The concentration can be measured in terms of the weight of the particle or powder per the total weight of the combination of the particle or powder with the epoxy. For example, the particle or powder can be present in a concentration of 25% wt./wt. relative to the total weight of the particle or powder and the epoxy. The dissolution temperature can be in a range having an upper limit and/or a lower limit. The range can include or exclude the upper and/or lower limit. The upper and/or lower limit can be selected from 100, 105, 110, 115, 116, 117, 118, 119, 120, 121, 122, 123, 124, 125, 126, 127, 128, 129, 130, 135, 140, 145, 150, 155, 160, 165, 170, 175, 180, 185, 190, 195, and 200 degrees Celsius. For example, the temperature can be 120 degrees Celsius. The dissolution time can be in a range having an upper limit and/or a lower limit. The range can include or exclude the upper and/or lower limit. The upper and/or lower limit can be selected from 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, and 12 hours. For example, the dissolution time can be less than 5 hours. Therefore, the particle or powder (25% wt./wt. concentration) can dissolve in epoxy at 120 deg C. in less than 5 hours. The concentration can include concentrations within the foregoing upper and/or lower limits.

A concentration of a particle or powder according to, the third embodiment can dissolve in N-methylpyrrolidone at a dissolution temperature and in a dissolution time. The concentration can be in a range having an upper limit and/or a lower limit. The range can include or exclude the upper and/or lower limit. The upper and/or lower limit can be selected from 1, 2, 3, 4, 5, 10, 15, 20, 21, 22, 23, 24, 25, 26, 27, 28, 29, 30, 35, 40, 45, 45.5, 46, 46.5, 47, 47.5, 48, 48.5, 49, 49.5, and 50%. The concentration can be measured in terms of the weight of the particle or powder per the total weight of the combination of the particle or powder with the pyrrolidone. For example, the particle or powder can be present in a concentration of 25% wt./wt. relative to the total weight of the particle or powder and the pyrrolidone. The dissolution temperature can be in a range having an upper limit and/or a lower limit. The range can include or exclude the upper and/or lower limit. The upper and/or lower limit can be selected from 70, 71, 72, 73, 74, 75, 76, 77, 78, 79, 80, 81, 82, 83, 84, 85, 86, 87, 88, 89, 90, 95, 100, 105, 110, 115, 120, 125, 130, 135, 140, 145, and 150 degrees Celsius. For example, the temperature can be 120 degrees Celsius. The dissolution time can be in a range having an upper limit and/or a lower limit. The range can include or exclude the upper and/or lower limit. The upper and/or lower limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 11, and 12 hours. For example, the dissolution time can be less than 5 hours. Therefore, the particle or powder (25% wt./wt.) can dissolve in N-methyl pyrrolidone in less than 2 hours at 80 degrees Celsius.

A fourth embodiment relates to a composition comprising one or more porous powders of polyetherimide, which can dissolve in epoxy in a time period in a range having an upper limit and/or a lower limit. The range can include or exclude the upper and/or lower limit. Generally, a porous powder will dissolve in more than 0 and less than 10 hours. The upper and/or lower limit can be selected from 10.0, 9.5, 9.0, 8.5, 8.0, 7.5, 7.0, 6.5, 6.0, 5.5, 5.0, 4.5, 4.0, 3.5, 3.0, 2.5, 2.0, 1.5, 1.0, and 0.5 hours. For example, the composition can dissolve in epoxy in less than 5 hours. The time period can include times within the foregoing upper and/or lower limits.

The polyimide can be selected from polyetherimides, siloxane-polyetherimides, polyetherimide sulfones and combinations thereof.

The porous powders in the composition according to the fourth embodiment can have an average size in a range having an upper limit and/or a lower limit. The range can include or exclude the upper and/or lower limit. The upper and/or lower limit can be selected from 60, 61, 62, 63, 64, 65, 66, 67, 68, 69, 70, 71, 72, 73, 74, 75, 76, 77, 78, 79, 80, 85, 90, 95, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, and 6000 microns. For example, the porous powders in the composition according to the fourth embodiment can have a diameter in the range of 75 to 5,000 microns, or an average diameter of from 200 to 800 microns. The average size can include average sizes within the foregoing upper and/or lower limits.

The porous powders in the composition according to the fourth embodiment can have an average pore size in a range having an upper limit and/or a lower limit. The range can include or exclude the upper and/or lower limit. The upper and/or lower limit can be selected from 100, 125, 150, 175, 200, 225, 226, 227, 228, 229, 230, 231, 232, 233, 234, 235, 236, 237, 238, 239, 240, 241, 242, 243, 244, 245, 246, 247, 248, 249, 274, 299, 300, 324, 349, 374, 399, 424, 449, 474, 499, 500, 600, 700, 800, 900, 1000, 1100, 1200, 1300, 1400, 1425, 1430, 1435, 1440, 1445, 1450, 1455, 1460, 1465, 1470, 1475, 1480, 1485, 1490, 1495, 1500, 1505, 1510, 1515, 1520, 1525, 1530, 1535, 1540, 1545, 1550, 1555, 1560, 1565, 1570, 1575, 1580, 1585, 1590, 1595, and 1600 Angstroms. For example, the pore size of the porous powders in the composition according to the fourth embodiment can be in a range from more than 237 to 1500 Angstroms, from 300 to 500 Angstroms, or up to 1000 Angstroms. The pore size can include pore sizes within the foregoing upper and/or lower limits.

The porous powders in the composition according to the fourth embodiment can have a pore volume in a range having an upper limit and/or a lower limit. The range can include or exclude the upper and/or lower limit. The upper and/or lower limit can be selected from 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, and 0.5 cc/g. For example, the porous powders in the composition according to the fourth embodiment can have a pore volume that is greater than 0.01 to 0.10 cc/g. The pore size can include pore sizes within the foregoing upper and/or lower limits.

The BET Surface area of the porous powders in the composition according to the fourth embodiment can be in a range having an upper limit and/or a lower limit. The range can include or exclude the upper and/or lower limit. The upper and/or lower limit can be selected from 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, 5.5, 6.0, 6.5, 7.0, 7.5, 8.0, 8.5, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, and 11.0 m²/g. For example, the BET Surface area of the porous powders in the composition according to the fourth embodiment can be from more than 2.3 to 10 m²/g. The BET Surface area can include BET Surface areas within the foregoing upper and/or lower limits.

A fifth embodiment relates to a porous powder comprising one or more polyimide particles. The polyimide can be selected from polyetherimides, siloxane-polyetherimides, polyetherimide sulfones and combinations thereof.

The one or more particles according to the fifth embodiment can have a size in a range having an upper limit and/or a lower limit. The range can include or exclude the upper and/or lower limit. The upper and/or lower limit can be selected from 60, 61, 62, 63, 64, 65, 66, 67, 68, 69, 70, 71, 72, 73, 74, 75, 76, 77, 78, 79, 80, 85, 90, 95, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, and 6000 microns. For example, the one or more particles according to the fifth embodiment can have a diameter in the range of 75 to 5,000 microns. The particle size can include particle sizes within the foregoing upper and/or lower limits.

The one or more particles according to the fifth embodiment can have a pore volume in a range having an upper limit and/or a lower limit. The range can include or exclude the upper and/or lower limit. The upper and/or lower limit can be selected from 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, and 0.5 cc/g. For example, the one or more particles according to the fifth embodiment can have a pore volume that is greater than 0.01 to 0.10 cc/g. The pore volume can include pore volumes within the foregoing upper and/or lower limits.

The pore size of the one or more particles according to the fifth embodiment can be in a range having an upper limit and/or a lower limit. The range can include or exclude the upper and/or lower limit. The upper and/or lower limit can be selected from 100, 125, 150, 175, 200, 225, 226, 227, 228, 229, 230, 231, 232, 233, 234, 235, 236, 237, 238, 239, 240, 241, 242, 243, 244, 245, 246, 247, 248, 249, 274, 299, 300, 324, 349, 374, 399, 424, 449, 474, 499, 500, 600, 700, 800, 900, 1000, 1100, 1200, 1300, 1400, 1425, 1430, 1435, 1440, 1445, 1450, 1455, 1460, 1465, 1470, 1475, 1480, 1485, 1490, 1495, 1500, 1505, 1510, 1515, 1520, 1525, 1530, 1535, 1540, 1545, 1550, 1555, 1560, 1565, 1570, 1575, 1580, 1585, 1590, 1595, and 1600 Angstroms. For example, the pore size of the one or more particles according to the fifth embodiment can be in a range from more than 237 to 1500 Angstroms, from 300 to 500 Angstroms, or up to 100.0 Angstroms. The pore size can include pore sizes within the foregoing upper and/or lower limits.

The BET Surface area of the one or more particles according to the fifth embodiment can be in a range having an upper limit and/or a lower limit. The range can include or exclude the upper and/or lower limit. The upper and/or lower limit can be selected from 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, 5.5, 6.0, 6.5, 7.0, 7.5, 8.0, 8.5, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, and 11.0 $m^2/g$. For example, the BET Surface area of the one or more particles according to the fifth embodiment can be from more than 2.3 to 10 $m^2/g$. The BET Surface area can include BET Surface areas within the foregoing upper and/or lower limits.

A sixth embodiment of the invention relates to a polymer system comprising a polymer, such as an epoxy, and a dissolved polyimide, such as a polyetherimide, wherein the polyimide dissolves in the polymer in less than 5 hours. The polyimide can be selected from polyetherimides, siloxane-polyetherimides, polyetherimide sulfones and combinations thereof.

According to the seventh embodiment, the polyimide can dissolve in the polymer in a time period in a range having an upper limit and/or a lower limit. The range can include or exclude the upper and/or lower limit. Generally, the time period is more than 0 and less than 10 hours. The upper and/or lower limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12 hours. For example, the polyimide can dissolve in the polymer in from 0.1 to 4.9 hours. The time period can include times within the foregoing upper and/or lower limits.

A seventh embodiment relates to an article of manufacture comprising a particle or powder according to the third embodiment, a composition according to the fourth embodiment, or a particle according to the fifth embodiment. The article of manufacture can be selected from thermoset composites, adhesives, coatings, films, and combinations thereof.

Our invention provides previously unavailable advantages. Since the porous powders of our invention dissolve in solvents substantially faster than ordinary powders, thereby reducing the time to make products based on polyimides. The powders of our invention do not require specialized material handling and dust inhalation precautions while simultaneously providing faster dissolution of thermoplastics in epoxy media. The ability to meet this need means that users of the porous powders can achieve shorter cycle times and cost savings for the products that they are made from.

Although the foregoing description has been directed to particles comprising polyimide porous powders, polyimide porous powders, and hot water and steam methods for making such materials, the scope of the invention includes embodiments in which polymer porous powders, other than those comprising polyimide, have high dissolution properties. Examples of such porous powders include those polymer porous powders made from the following materials: (i) polyethersulfones, (ii) polysulfones, (iii) polyphenylene ether sulfones, (iv) polycarbonates, (v) polycarbonate copolymers, (vi) polyesters, (vii) polyester copolymers, (viii) fluorinated polymers, e.g., fluorinated polyvinylediene polymers, (ix) polyphenylene oxides, (x) polyphenylene oxide copolymers, (xi) polybenzoxazoles, (xii) polybenzimidazoles, (xiii) polysulfone siloxanes, (xiv) polyether sulfone siloxanes, (xv) polyphenylene ether sulfone siloxanes, (xvi) polyphenylene oxide siloxanes and (xvii)) blends (combinations) of the foregoing. Our invention also includes steam methods and water methods for making porous powders from the foregoing polymers.

The invention is further described in the following illustrative examples in which all parts and percentages are by weight unless otherwise indicated.

EXAMPLES

The following examples demonstrate how to make large polymer particles (>75 microns particle size), exhibiting high dissolution features by a hot water precipitation method and a steam precipitation method, according to various embodiments. These larger polymer particles are compared to materials made by different methods.

Materials

The following materials were employed in these examples.

| Materials | Description | Source |
| --- | --- | --- |
| Mechanically Ground PEI Powder | Ultem ® 1000 powder made by mechanical grinding | SABIC ® |
| Jet Milled PEI Powder | Ultem ® 1000 powder made by jet milling | SABIC ® |
| Emulsion-prepared PEI Powder (with surfactant) | Ultem ® 1000 powder made by emulsion process with surfactant | SABIC ® |

-continued

| Materials | Description | Source |
|---|---|---|
| Hot Water process Prepared Powder | Ultem ® 1000 powder made by hot water precipitation process | SABIC ® |
| Steam process prepared powder | Ultem ® 1000 powder made by steam precipitation process | SABIC ® |

Note:
Ultem ® 1000 is a polyetherimide.

Techniques & Procedures

Various techniques and procedures were employed. Comparative processes included a mechanically ground process, a jet milling process, and an emulsion process.

Mechanically Ground Process

Polymer pellets were ground using steel grinding plates and passed through a sieve. The mean particle size of the powder was 350 microns and 95% of the particles were below 600 microns.

Jet Milling Process

This process uses air under high pressure to micronize polymer pellets into ultra-fine powders. (For more information see: CF Winnacker, Kuchler: Chemische Technologie, 4 Edition, Volume 1, P. 91-93, Carl Hanser Verlag Mutichen, Wien 1984). Jet mills consist of a milling section, into which high-pressure air is blown, and the polymer pellets are brought into the milling section across an injector by a compressed air stream. The particle size of the jet-milled polymer is less than 45 microns in diameter (measured by laser scattering technique).

Emulsion Process 20 grams of polymer (polyetherimide, Ultem®1000) was dissolved in 133 grams of methylene chloride to produce a solution with 15 wt % solids concentration. 300 ml of deionized water was added to this solution along with 2000 ppm of surfactant (sodium dodecyl sulphate, sodium dodecyl benzene sulfonate or triton X-100) and homogenized using lab homogenizer (BioSpec® BioHomogenizer from Fisher Scientific) at 10,000 rpm for 2 min. The methylene chloride was removed from the resulting emulsion using distillation at 60 to 80 degrees Celsius. 50-100 ppm of antifoam (silicone based) was used to control the foam. The fine powder dispersed in water was filtered, washed with deionized water thrice, and dried in vacuum at 120 degrees Celsius for eight hours. The resulting spherical polymer powder has particle size less than 45 microns in diameter (measured by laser scattering technique).

Hot Water Process

Polymer (polyetherimide, Ultem® 1000) was dissolved in methylene chloride to produce a solution with 1-2 wt % solids concentration. The solution was pumped to a high shear mixer where it was mixed with DI water. The resulting liquid-liquid dispersion was pumped to heated, stirred tank. The tank was kept at 80-90 deg C. using steam on the jacket and a steam sparge flow within the tank. Solution was fed to the tank at 0.5 gpm (gallons per minute) and mixed with water at 1 gpm. Total fill time was 30 min. The resulting slurry was then pumped to a second stirred tank for removal of residual methylene chloride. Similar to the first tank, this tank is steam jacketed and also has a steam sparge flow in the tank to maintain the tank temperature near 100-105 deg C. After a 20-30 minute residence time, the slurry was then pumped to a centrifuge filter to remove free water and collect the solid product. The collected product was then oven dried to remove residual water and methylene chloride at >80 deg C. for >12 hrs. The resulting polymer powder had particle size around 900 microns in diameter (measured by laser scattering technique).

Steam Precipitation Process

Polymer (polyetherimide, Ultem® 1000) were dissolved in methylene chloride to produce the desired solids concentration. Concentrations were controlled 4.8 and 9 wt %. Experiments were conducted in a lab scale steam precipitation system. The lab precipitation jet consists of steam flow passage with a perpendicular resin solution injector. Steam flow rate was controlled by the steam back pressure. Resin solution flow rate was controlled by the use of $N_2$ pressure in the resin feed pot. Increasing either the resin or steam feed pressure resulted in high flow rates of the particular steam. Varying the two pressures allowed control of the S/R ratio which was an important parameter influencing the powder properties.

From the precipitation jet, the powder formed was transported through a short (<12") conveying tube to a product collection pot. The collected product was then oven dried to remove residual water and methylene chloride at >80 deg C. for >12 hrs.

The resulting polymer powder had a particle size around 1200 microns in diameter (measured by laser scattering technique).

Dissolution Techniques/Procedures

In order to evaluate dissolution properties of the powders made by the mechanically ground PEI powder, the jet-milled PEI process, the emulsion-prepared PEI powder, the hot water process, and the steam powder, the powder made by each of the above process was dissolved as follows. The powder samples made from different process techniques were dissolved in epoxy (Araldite® 506) to produce a solution with 25 wt % solid concentration at 120 degrees Celsius as well as in N-methyl pyrollidone at 80 degrees Celcius and the time taken to fully dissolve was monitored (Table 1).

Particle Size Analysis Through Light Scattering

In order to determine the particle size distribution of the powders used in the examples, light scattering analysis was done. The sample was dispersed in methanol using a sonicator for two minutes. The particle size distribution was measured through laser scattering technique. The $D_{0.9}$ values indicate 90% of particles (by volume) are below the given particle size in micro meter)

BET Analysis Procedure/Technique

In order to determine the physical parameters of the powders used in the examples, pore size analysis was done by BET method (physical adsorption of gas molecule on the surface). The sample was kept under vacuum at 120 degrees Celsius for four hours to remove all the gases. The "outgassed" sample is then cooled down to approximately −196 degrees Celsius. Ultra purenitrogen is admitted into the sample tube where the sample can adsorb the gas molecules. The surface area, total pore volume and average pore size in the samples is calculated by the uptake of nitrogen gas.

Examples 1-2

The purpose of these examples was to demonstrate porous PEI powders made in accordance to the procedure for steam and hot water as described above. Table 1 presents the results for Example 1 and Example 2.

TABLE 1

| Ex. | Method | Particle size $D_{0.9}$ from laser scattering Microns | Specific Surface area from laser scattering, $(m^2/g)$ | Time required to dissolve in N-methyl pyrollidone at 80° C. | Time required to dissolve in epoxy (Araldite ® 506) at 120° C. | BET Surface Area $(m^2/g)$ | Total pore volume (cc/g) | Average Pore Size (A) |
|---|---|---|---|---|---|---|---|---|
| 1 | Hot water process | 982 | 0.0306 | <1 hours | <2 hours | 4.7 | 0.042 | 353 |
| 2 | Steam process | 1171 | 0.0336 | <1 hours | <2 hours | 7.5 | 0.071 | 379 |

Discussion

The results presented in Table 1 show that powders made by the hot water process and by the steam process unexpectedly produced powders that dissolved quickly, i.e. powders that dissolve in more than 0 second but less than five hours. More specifically, the powders of Example 1 and Example 2 dissolved in less than two hours.

The results indicated that the particle size of the powders was more than 75 microns in diameter and less than 5000 microns. The pore volume of the powders ranged from more than 0.01 cc/g to 0.10 cc/g. More specifically, the pore volume of the particles produced according to Example 1 and Example 2 was 0.042 and 0.071 cc/g, respectively. The pore size of the particles ranged from 300 to 1500 Angstroms. More specifically, the pore size of the particles produced according to Example 1 and Example 2 was 353 and 379 Angstroms, respectively.

Figure 2:
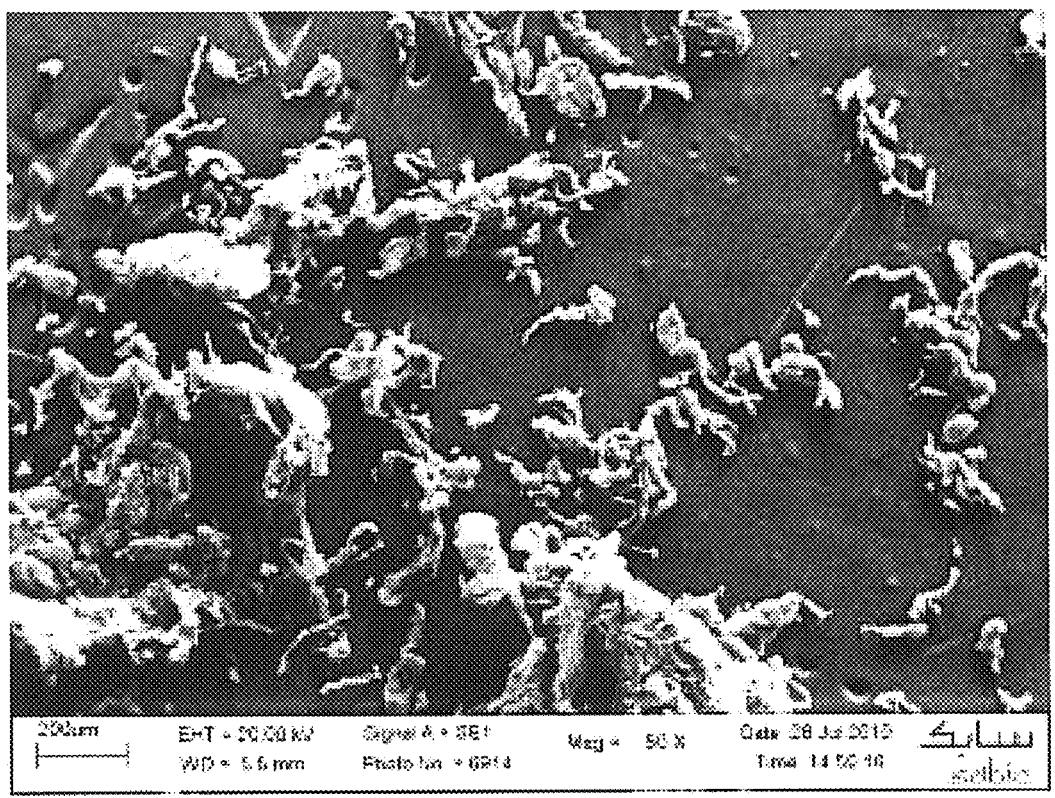
FIG. 2 is an image of particles produced according to Example 2.

Microscopic pictures of the particles produced according to Example 1 and Example 2 are shown in FIG. 1 and FIG. 2, respectively.

The powders exhibited highly useful properties. Since the particles were more than 75 microns in diameter, they were less prone to dust inhalation, and/or explosion. Thereby, the particles are more Environmental Health and Safety (EHS) friendly. Moreover, the diameter of more than 75 microns makes the particles easier to convey via process machinery, for example, feeding through or into a hopper. Since the dissolution rate was less than two hours, the particles can enable manufacturers of materials that use PEI to lower the cycle time of their manufacturing processes.

Examples 3-5

Purpose

The purpose of these examples was to show powders made in accordance to the mechanical grinding process, the jet milling process, and the emulsion-process.

Techniques and Procedures

In Example 3, powders were made according to procedures for the mechanical grinding process as described above.

In Example 4, powders were made according to the procedures for the jet milling process, as described above In Example 5, powders were made according to the procedures for the emulsion process, as described above Results The results for each process are shown in Table 2.

TABLE 2

| Comp. Ex. | Process | Particle size $D_{0.9}$ from laser scattering | Specific Surface area from laser scattering, m2/g | Time required to dissolve in N-methyl pyrrolidone at 80° C. | Time required to dissolve in epoxy (Araldite ® 506) at 120° C. | BET Surface Area $(m^2/g)$ | Total pore volume (cc/g) | Average Pore Size (A) |
|---|---|---|---|---|---|---|---|---|
| 3 | Mechanic Grinding | NM | NM | >8 hours | >24 hours | ~0 NM | ~0 NM | ~0 NM |
| 4 | Jet Mill | 24.69 | 0.664 | >8 hours | >12 hours | 1.7 | 0.01 | 177 |
| 5 | Emulsion | 17.98 | 1.52 | >8 hours | >10 hours | 2.3 | 0.01 | 237 |

NM = "not measurable"

Discussion

These results show that powders made in accordance to mechanical grinding, jet milling, and emulsion processes, exhibited dissolution rates, in epoxy that were more than five hours. More specifically, the powders of Example 3, Example 4, and Example 5 dissolved in periods that lasted more than 24 hours, 12 hours, and 10 hours, respectively. Powders made in accordance to mechanical grinding, jet milling, and emulsion processes, exhibited dissolution rates in N-methyl pyrrolidone that were more than five hours. More specifically, the powders of Example 3, Example 4, and Example 5 dissolved in periods that lasted more than 8 hours. The powders did not exhibit both a diameter in the range of 75 to 5,000 microns and a pore volume that is greater than or equal to 0.01 to 0.10 cc/g.

With respect to the pore volume of the powders of Examples 3-5, the particle volume was not more than 0.01 cc/g, but was rather 0.01 cc/g or less. With respect to the average pore size of the powders, the average pore size of Examples 3, 4, and 5 were approximately 0 (not measurable), 177, and 237 Angstroms, respectively, outside the physical parameters of inventive embodiments.

Figure 3:
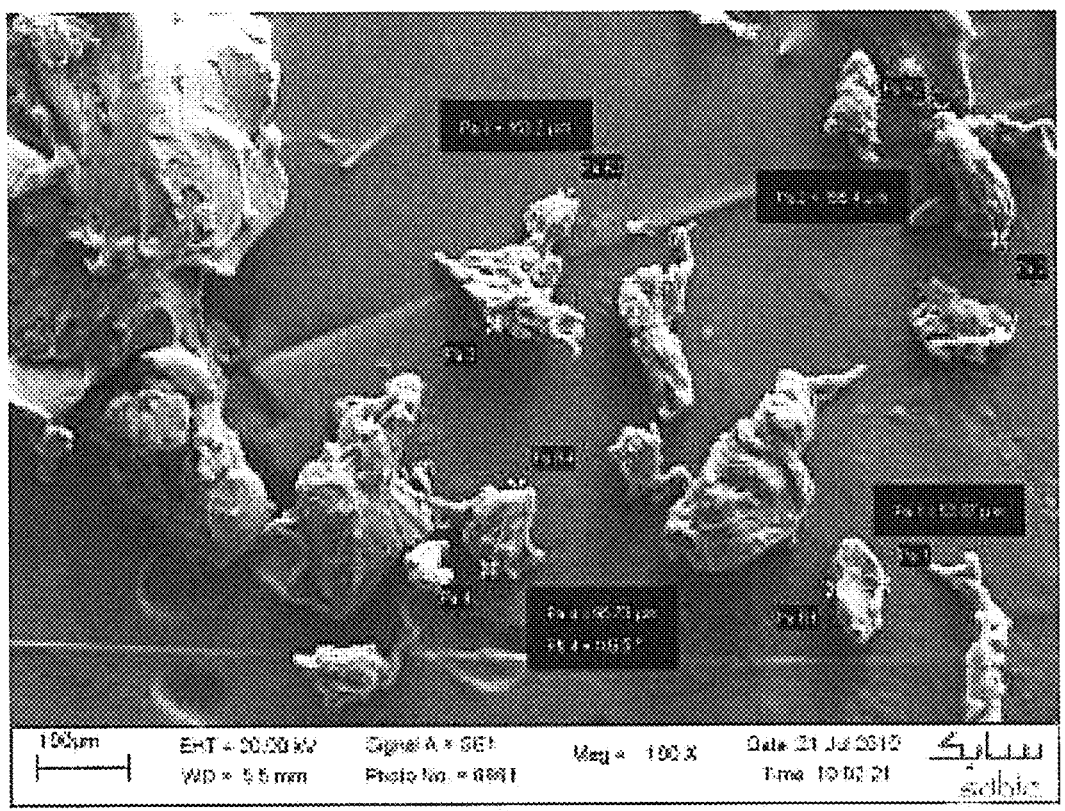
FIG. 3 is an image of particles produced according to Example 3.
Figure 4:
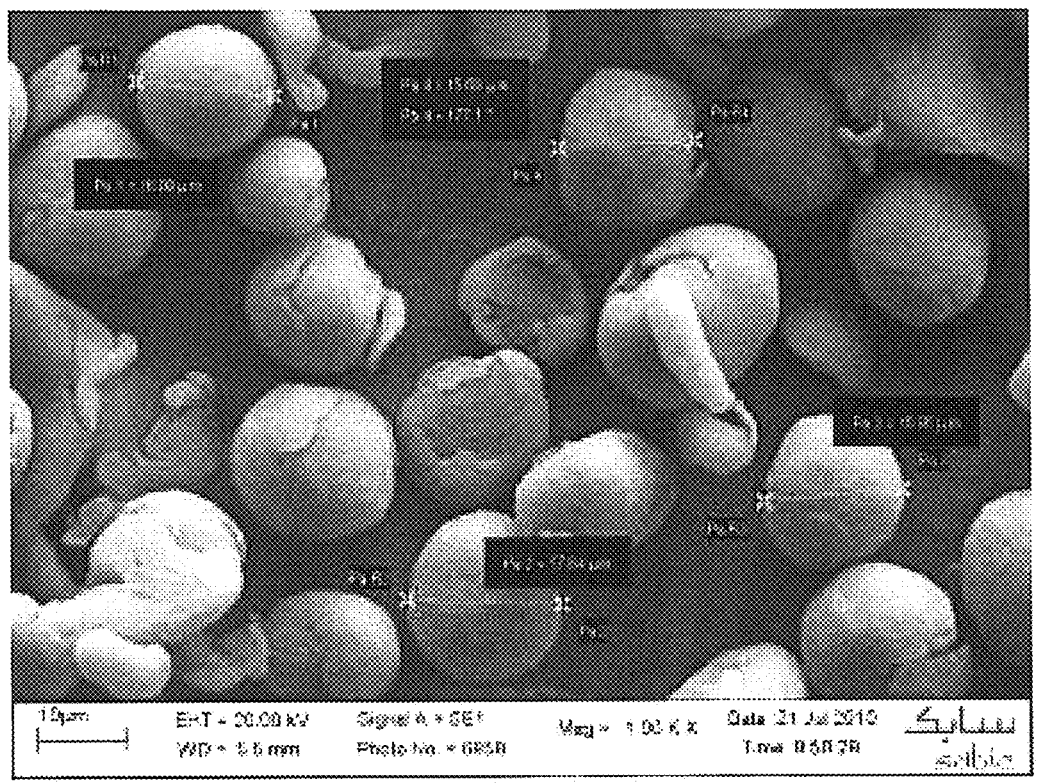
FIG. 4 is an image of particles produced according to Example 4.
Figure 5:
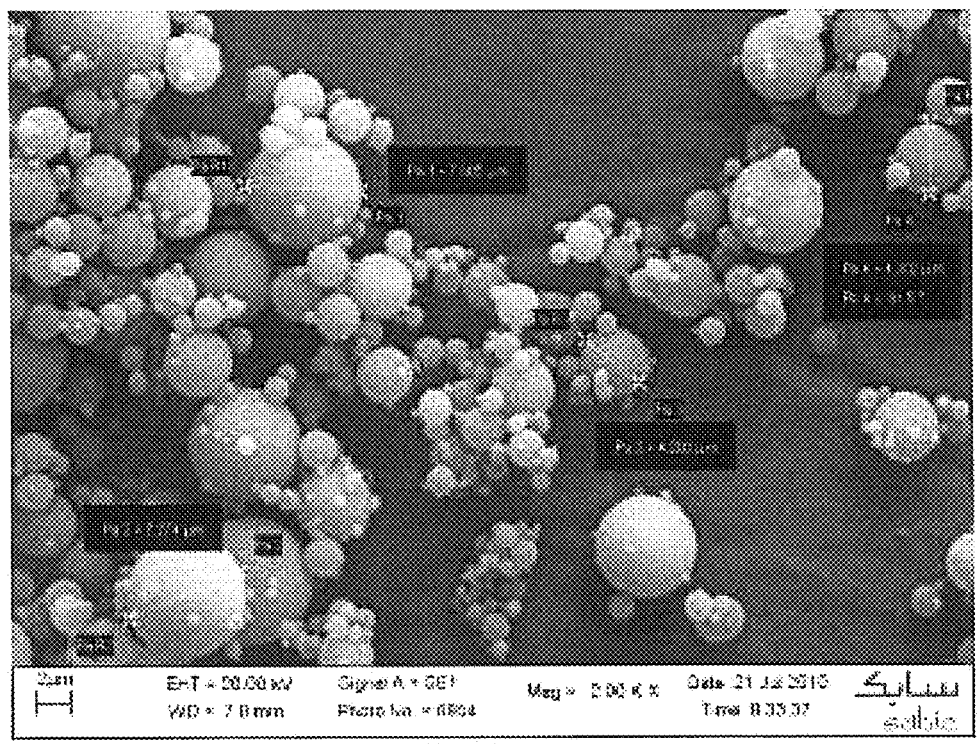
FIG. 5 is an image of particles produced according to Example 5.

Microscopic pictures of the particles produced according to Example 3, Example 4, and Example 5 are shown in FIG. 3, FIG. 4, and FIG. 5, respectively.

The powders did not exhibit highly useful properties. Since the dissolution rate was more than five hours, the powders would not provide manufacturers of materials that use PEI the opportunity to lower the cycle time of their manufacturing processes.

It can be seen that Ultem® powders made though hot water process and steam process (Examples 1 and 2) show high pore volume and pore size. Without wishing to be bound by theory, this high pore volume and pore size could be the reason for the rapid dissolution of Examples 1 and 2.

With respect to the dissolution rate of the powders of the comparative examples, it can be seen that particles <45 microns (Examples 4-5) dissolved in epoxy faster compared to coarse powder (Example 3). However, the dissolution rates of these powders was more than 5 hours and, as such, unsuitable for the uses that our invention is intended to be used in. (Example 3).

Remarkably, powders made from hot water process (Example 1) as well as the steam process (Example 2) dissolved at least five times faster than <45-micron powders. This is not expected as the particles are >900 microns in size.

Examples 6-8

Example 6

Figure 6:
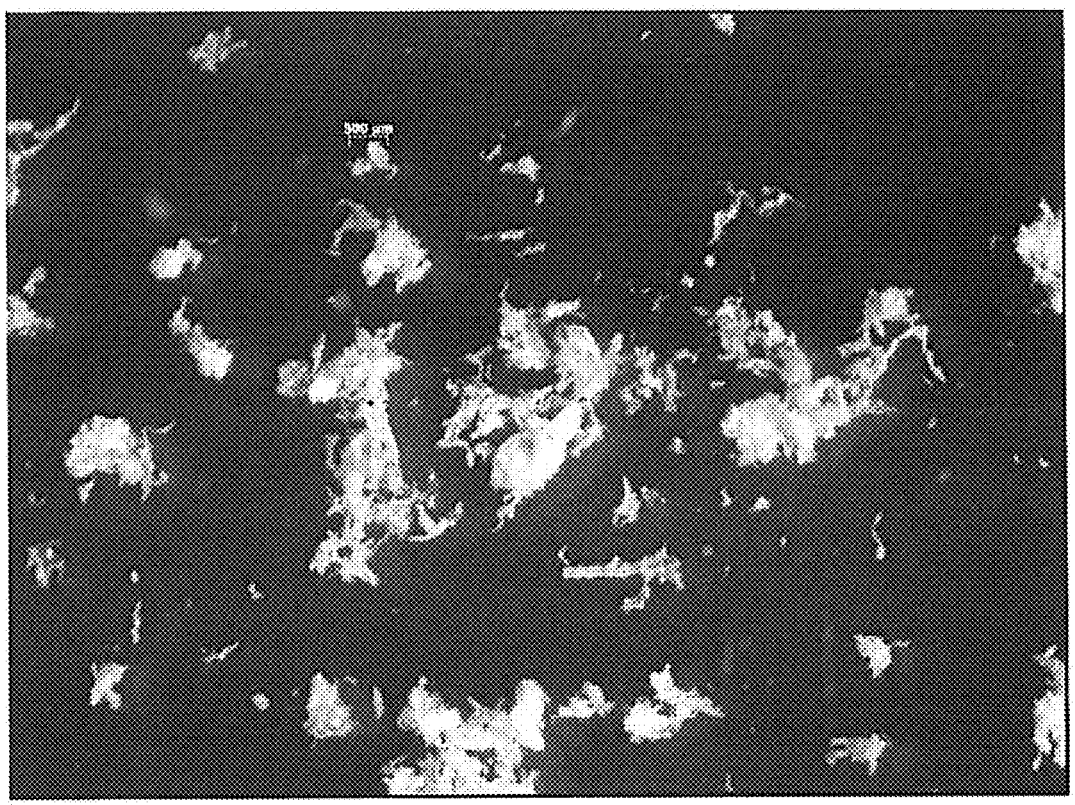
FIG. 6 is an image of particles produced according to Example 6.

2% polyetherimide (Ultem® 1000) solution in methylene chloride was prepared. Water was mixed to this solution in a 1:1 ratio. The resulting solution was emulsified using a high shear mixing element (8000 rpm). Methylene chloride was removed from the emulsion by heating the solution at 80 degrees Celsius, which resulted in polymer precipitation. The resulting polymer particles were centrifuged and dried in a conventional vacuum oven. 0.25 grams of the resulting polyetherimide powder was dissolved in 5 grams of methylene chloride, in 5 grams of dimethylacetamide, in 5 grams Araldite® 506 Epoxy, and in 5 grams of ERL 4221 Epoxy (3,4 Epoxy Cyclohexyl Methyl 3,4 epoxy Cyclohexyl Carboxylate). FIG. 6 shows an optical image of the polyetherimide powder produced according to Example 6.

Example 7

Figure 7:
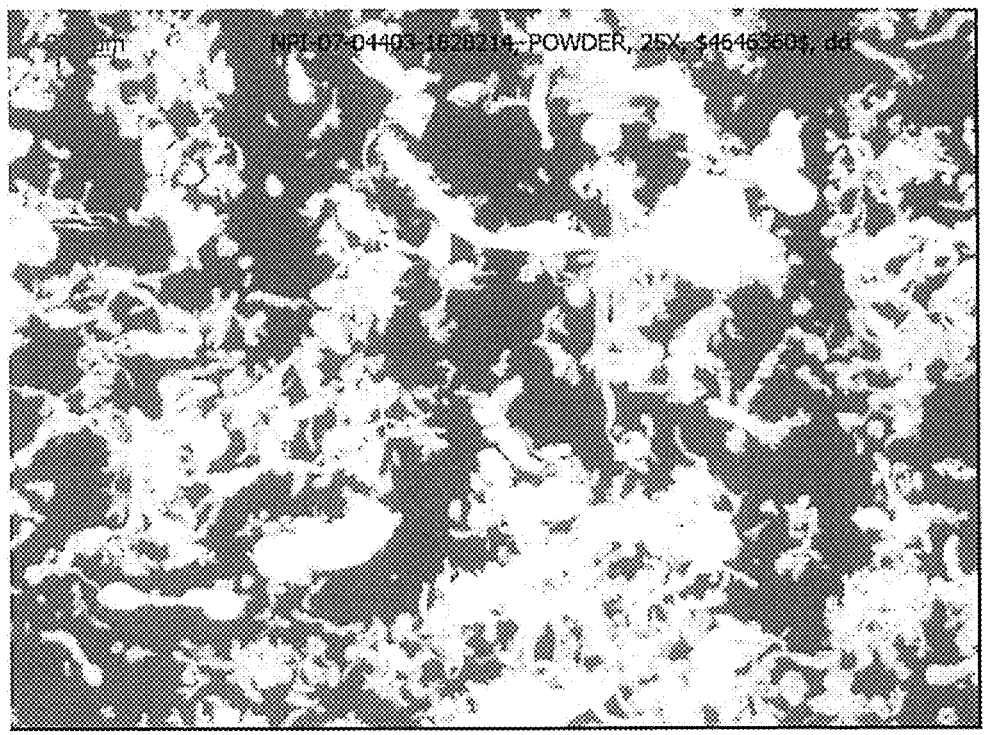
FIG. 7 is an image of particles produced according to Example 7.

8% polyetherimide (Ultem® 1000) solution in methylene chloride was prepared. The solution was passed through steam, which removed the methylene chloride solvent. The resulting polymer particles were centrifuged and dried in conventional vacuum oven. 0.25 grams of the resulting polyetherimide powder was dissolved in 5 grams of methylene chloride, in 5 grams of dimethylacetamide, in 5 grams Araldite®506 Epoxy, and in 5 grams of ERL 4221 Epoxy. FIG. 7 shows an optical image of the polyetherimide powder produced according to Example 7.

Example 8

As a comparative example, polyetherimide (Ultem®1000) was mechanically ground via a jet-milling process into powder with particle size less than 45 microns. 0.25 grams of the resulting polyetherimide powder was dissolved in 5 grams of methylene chloride, in 5 grams of dimethylacetamide, in 5 grams Araldite® ®506 Epoxy, and in 5 grams of ERL 4221 Epoxy.

Results

Table 3 summarizes the results of Examples 6-8.

TABLE 3

| Example | Dissolution in methylene chloride | Dissolution in dimethylacetamide | Dissolution in Epoxy (Araldite ® 506) at 120° C. | Dissolution in Epoxy (ERL 4221) at 120° C. |
| --- | --- | --- | --- | --- |
| 6 | <1 min | <5 min | <2 hours | <2 hours |
| 7 | <1 min | <5 min | <2 hours | <2 hours |
| 8 | >5 min | >15 min | >5 hours | >5 hours |

Discussion

These results demonstrate significantly improved dissolution times in both organic solvents and in epoxies can be achieved with polyetherimide particles prepared according to Examples 1 and 2.

Examples 9-12

The purpose of these examples was to make porous powders, in accordance with the invention, by steam precipitation.

Example 9

The powders were made in accordance to the steam process of Example 2, except that the following conditions were used. The example was performed in a larger scale steam precipitation system. The steam flow was set at 170 pph (parts per hundred). The resin solution containing 6.3 wt % solids was fed at 0.4 gpm. The powder from the steam precipitation was fed directly to a fluid bed dryer, where the powder was dried using hot nitrogen until the dryer temperature reached 205 deg F. (96° C.).

Example 10

The powders were made in accordance to the steam process of Example 2, except that the following conditions were used: The example was performed in a larger scale steam precipitation system. The steam flow was set at 170 pph. The resin solution containing 4.4 wt % solids was fed at 0.4 gpm. The powder from the steam precipitation was fed directly to a fluid bed dryer, where the powder was dried using hot nitrogen until the dryer temperature reached 205 deg F. (96° C.).

Example 11

The powders were made in accordance to the steam process of Example 2, except that the following conditions were used. The experiment was performed in a larger scale steam precipitation system. The steam flow was set at 170 pph. The resin solution containing 4 wt % solids was fed at 0.7 gpm. The powder from the steam precipitation was fed directly to a fluid bed dryer, where the powder was dried using hot nitrogen until the dryer temperature reached 205 deg F. (96° C.).

Example 12

The powders were made in accordance to the steam process of Example 2, except that the following conditions were used: The experiment was performed in a larger scale steam precipitation system. The steam flow was set at 170 pph. The resin solution containing 5.9 wt % solids was fed at 0.7 gpm. The powder from the steam precipitation was fed directly to a fluid bed dryer, where the powder was dried using hot nitrogen until the dryer temperature reached 205 deg F. (96° C.).

The results of Examples 9-12 are summarized below in Table 4:

TABLE 4

| Ex. | Method | Time required to dissolve in N-methyl pyrollidone at 80° C. | BET Surface Area (m²/g) | Total Pore Volume (cc/g) | Average Pore Size (Å) |
|---|---|---|---|---|---|
| 9 | Steam Process | <1 hours | 2.8 | 0.013 | 188 |
| 10 | Steam process | <1 hours | 4.5 | 0.016 | 139 |
| 11 | Steam process | <1 hours | 5.8 | 0.018 | 124 |
| 12 | Steam process | <1 hours | 2.6 | 0.010 | 152 |

The results presented in Table 4 show: that powders made by the steam process unexpectedly produced powders that dissolved quickly, i.e. powders that dissolve in more than 0 seconds, but less than five hours. More specifically, the powders of Example 9 and Example 10, Example 11, and Example 12 dissolved in less than one hour.

The powders exhibited highly useful properties. Since the particles were more than 75 microns in diameter, they were less prone to dust inhalation, and/or explosion. Thereby, the particles are more Environmental Health and Safety EHS) friendly. Moreover, the diameter of more than 75 microns makes the particles easier to convey via process machinery, for example, feeding through or into a hopper. Since the dissolution rate was less than two hours, the particles can enable manufacturers of materials that use PEI to lower the cycle time of their manufacturing processes.

Example 13-17

The purpose of these examples was to make porous powders, in accordance with the invention, by the hot water process.

Example 13

The powders were made in accordance to the hot water process of Example 1, except that the following conditions were used: The resin solution contained 1.7-2.0 wt % Ultem 1000. The solution was fed at a mass flow rate of 7-8 pounds per minute. The temperature in the first devolatilization tank was maintained in the range of 178-199 deg F. The resulting powder was then held at a temperature of 217-222 deg F. (103 to 106° C.) for approximately 30 minutes to remove residual methylene chloride solvent.

Example 14

The powders were made in accordance to the hot water process of Example 13

Example 15

The powders were made in accordance to the hot water process of Example 13.

Example 16

The powders were made in accordance to the hot water process of Example 13:

Example 17

The powders were made in accordance to the hot water process of Example 13:

The results of Examples 13-17 are summarized below in Table 5:

TABLE 5

| Ex. | Method | Time required to dissolve in N-methyl pyrollidone at 80° C. | BET Surface Area (m²/g) | Total Pore Volume (cc/g) | Average Pore Size (Å) |
|---|---|---|---|---|---|
| 13 | Hot Water | <1 hours | 2.8 | 0.028 | 171 |
| 14 | Hot Water | <1 hours | 4.5 | 0.028 | 188 |
| 15 | Hot Water | <1 hours | 5.8 | 0.014 | 156 |
| 16 | Hot Water | <1 hours | 2.6 | 0.020 | 229 |
| 17 | Hot Water | <1 hours | 2.6 | 0.016 | 171 |

The results presented in Table 5 show that powders made by the steam process unexpectedly produced powders that dissolved quickly, i.e. powders that dissolve in more than 0 seconds, but less than five hours. More specifically, the powders of Example 13 and Example 14, Example 15, and Example 16, and Example 17 dissolved in less than one hour.

The powders exhibited highly useful properties. Since the particles were, more than 75 microns in diameter, they were less prone to dust inhalation, and/or explosion. Thereby, the particles are more Environmental Health and Safety (EHS) friendly. Moreover, the diameter of more than 75 microns makes the particles easier to convey via process machinery, for example, feeding through or into a hopper. Since the dissolution rate was less than two hours, the particles can enable manufacturers of materials that use PEI to lower the cycle time of their manufacturing processes.

Although the present invention has been described in considerable detail with reference to certain preferred versions thereof, other versions are possible. Therefore, the spirit and scope of the appended claims should not be limited to the description of the preferred versions contained herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A porous powder comprising at least one polyimide porous particle,
   wherein the shape of the particle is a fluffy, non-spherical shape of a size in the range of 75 to 5,000 microns; and
   wherein the pore volume of the particle is from greater than or equal to 0.01 to 0.10 cc/g.

2. The porous powder of claim 1, wherein the pore size of the at least one porous particle is from more than 237 to 1500 Angstroms.

3. The porous powder of claim 1, wherein the BET Surface area of the at least one porous particle is from more than 2.3 to 10 m2/g.

4. The porous powder of claim 1, wherein the at least one porous particle (25% wt./wt. concentration) dissolves in epoxy at 120 degrees Celsius in less than 5 hours.

5. The porous powder of claim 1, wherein the at least one porous particle (25% wt./wt. concentration) dissolves in N-methyl pyrrolidone in less than 2 hours at 80 degrees Celsius.

6. A composition comprising a porous powder of polyetherimide, wherein the powder comprises at least one particle, wherein the particle has a size of from 200-800 microns having a fluffy, non-spherical shape, and wherein the composition dissolves in epoxy in less than 5 hours.

7. The composition according to claim 6, wherein the particle has an average pore size in the range of more than 237 to 1,500 Angstroms.

8. An article of manufacture comprising a composition according to claim 6.

9. A porous powder comprising polyimide,
wherein the porous powder comprises at least one particle having a fluffy, non-spherical shape in a size in the range of 75 to 5,000 microns: and
wherein the pore volume of the porous powder is from greater than 0.01 to 0.10 cc/g,
wherein the pore size of the porous powder is from more than 237 to 1500 Angstroms, and
wherein the BET Surface area of the porous powder is from more than 2.3 to 10 m2/g.

10. An article of manufacture comprising a composition according to claim 9.

11. The porous powder of claim 9, wherein the polyimide is selected from the group of polyetherimides, siloxane-polyetherimides, polyetherimide sulfones, and combinations thereof.

* * * * *